United States Patent [19]

Youda et al.

[11] Patent Number: 4,663,683
[45] Date of Patent: May 5, 1987

[54] MAGNETORESISTIVE THIN FILM HEAD

[75] Inventors: Hiroshi Youda, Hirakata; Nobuyuki Kaminaka, Neyagawa; Satoru Mitani, Hirakata, all of Japan

[73] Assignee: Matsushita Electric Industrial Co., Ltd., Osaka, Japan

[21] Appl. No.: 629,546
[22] PCT Filed: Nov. 10, 1983
[86] PCT No.: PCT/JP83/00401
§ 371 Date: Jul. 3, 1984
§ 102(e) Date: Jul. 3, 1984
[87] PCT Pub. No.: WO84/02028
PCT Pub. Date: May 24, 1984

[30] Foreign Application Priority Data

Nov. 11, 1982 [JP] Japan ............................. 57-198686
Nov. 19, 1982 [JP] Japan ............................. 57-204061
Jun. 13, 1983 [JP] Japan ............................. 58-105199

[51] Int. Cl.⁴ .......................... G11B 5/127; G11B 5/33
[52] U.S. Cl. ............................ 360/113; 338/32 R; 324/252; 360/110; 360/124; 360/125
[58] Field of Search ............... 360/113, 124, 125, 110; 338/32 R; 324/252

[56] References Cited

U.S. PATENT DOCUMENTS

| | | | |
|---|---|---|---|
| 3,019,125 | 1/1962 | Eggenberger et al. | 360/131 |
| 4,040,113 | 8/1977 | Gorter | 360/113 X |
| 4,052,748 | 10/1977 | Kuijik | 360/113 X |
| 4,103,315 | 7/1978 | Hempstead et al. | 360/110 X |
| 4,142,218 | 2/1979 | Gorter | 360/113 X |
| 4,315,291 | 2/1982 | Lazzari | 360/113 X |
| 4,321,640 | 3/1982 | van Gestel | 360/113 X |
| 4,477,794 | 10/1984 | Nomura et al. | 338/32 R X |
| 4,492,997 | 1/1985 | Arai et al. | 360/113 X |
| 4,503,394 | 3/1985 | Kawakami et al. | 360/113 X |
| 4,535,375 | 8/1985 | Mowry et al. | 360/113 X |
| 4,556,925 | 12/1985 | Suenaga et al. | 360/113 X |

FOREIGN PATENT DOCUMENTS

| | | | |
|---|---|---|---|
| 52-23924 | 2/1977 | Japan | 360/113 |
| 55-97020 | 7/1980 | Japan | 360/113 |
| 57-203219 | 12/1982 | Japan | 360/113 |
| 57-208624 | 12/1982 | Japan | 360/113 |
| 58-143403 | 8/1983 | Japan | 360/113 |
| 58-14118 | 1/1984 | Japan | 360/113 |
| 59-92419 | 5/1984 | Japan | 360/113 |

OTHER PUBLICATIONS

IBM Tech. Discl. Bull., vol. 20, No. 6, Nov. 77, pp. 2441-2442, "Initializing . . . Magnetoresistive Sensors" by Ferg.

Primary Examiner—John H. Wolff
Assistant Examiner—Alfonso Garcia
Attorney, Agent, or Firm—Wenderoth, Lind & Ponack

[57] ABSTRACT

In a magnetic head which utilizes the magnetoresistive effect of a ferromagnetic thin film, it is possible to realize a magnetoresistive effect type thin film magnetic head with favorable secondary distortion characteristics by forming on at least one surface of the ferromagnetic thin film, a grating forming an angle larger than 60° and smaller than 80° with respect to the direction of the electric current flowing through the thin film. By setting the grating into more than two different directions, a magnetic head capable of functioning at a still smaller distortion is presented.

4 Claims, 13 Drawing Figures

FIG. I
PRIOR ART
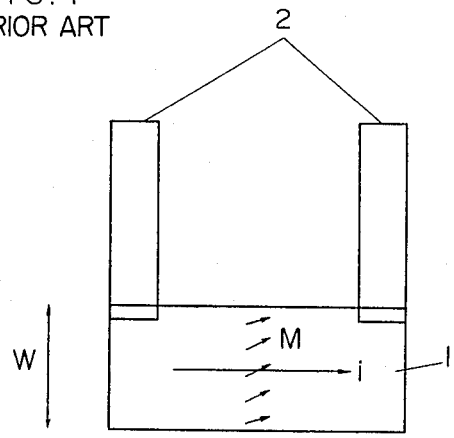
FIG. 2
PRIOR ART
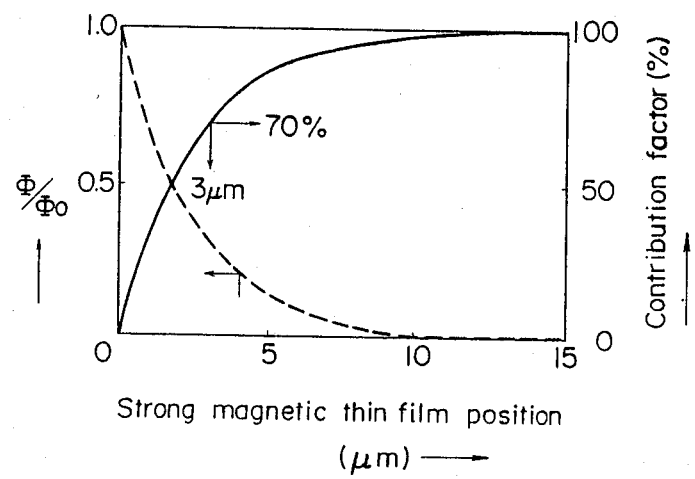

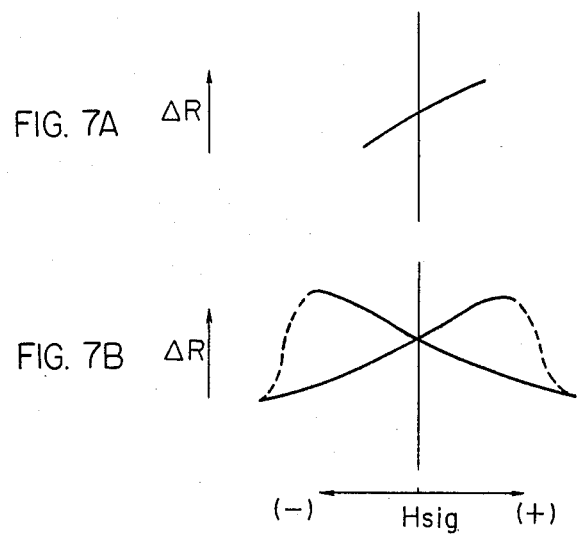
FIG. 7A
FIG. 7B
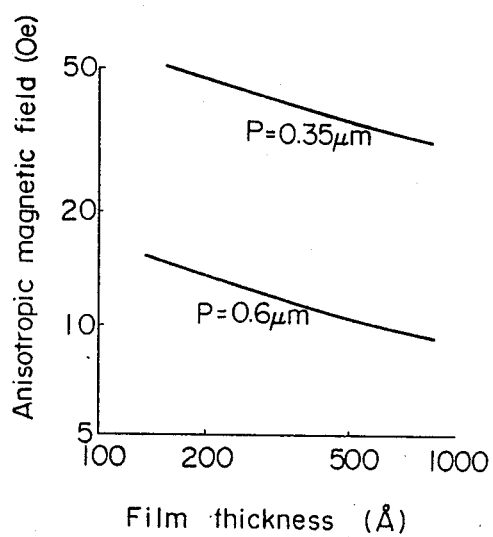
FIG. 8

MAGNETORESISTIVE THIN FILM HEAD

BACKGROUND OF THE INVENTION

1. Field of the Invention

The present invention relates to a thin film magnetic head employed for reproduction of signal magnetization on a magnetic recording medium such as a magnetic tape or the like.

2. Prior Art

The thin film magnetic head (referred to merely as the MR head hereinafter) employing the magnetoresistance effect (referred to merely as MR effect) of a ferromagnetic thin film is suitable for a reproducing head of PCM signals, etc. owing to the facts that its reproducing output does not depend on the relative speed with respect to the recording medium, and that the output thereof is comparatively large. However, for actual use, the thin film magnetic head as described above must be set, in its functioning point, at a place where the linearity thereof is as favorable as possible, since the relation between the external magnetic field and its resistance is non-linear.

Incidentally, in the MR head as described above, shield layers of a high permeability material are disposed at opposite sides of the ferromagnetic thin film for improving a resolution with respect to the signal magnetic field, and therefore, a bias impressing means for effectively applying a bias magnetic field to the ferromagnetic thin film is disposed within the shield layers.

For applying such a bias magnetic field, there has been considered a method for providing a hard magnetic film in the vicinity of the ferromagnetic thin film and a method in which electric current is caused to flow through an electrically conductive film disposed close to the ferromagnetic thin film. However, the former method has a problem related to demagnetization of the recording medium by the hard magnetic film used for the biasing. Meanwhile, the latter practice has such a disadvantage that in the case of a narrow gap head, distortion tends to be large, since the bias current cannot be caused to flow up to the optimum point due to a limitation in the current capacity of the film, and if a push-pull construction is employed for reduction of the distortion, azimuth accuracy of a very high degree is required, thus presenting a difficulty for actual applications from the viewpoint of interchangeability. Moreover, when the bias means as described earlier is disposed in the gap between the ferromagnetic film and the shield layers, this presents an obstruction in the case where the gap length is shortened, and thus, production of the MR head as a short wavelength reproducing head is made difficult.

SUMMARY OF THE INVENTION

The present invention has for its object to provide a narrow gap thin film magnetic head which is capable of reproducing short wavelengths with less distortion, by setting the functioning point of a ferromagnetic thin film at the optimum value, without providing within the gap a bias means which may present a limitation in the reduction of gap length.

In accomplishing the above object, according to the present invention, there is provided an MR head which includes a ferromagnetic thin film having grating on at least one surface for displaying an MR effect, with angles formed between the direction of the grating and electric current flowing through said thin film being set to be larger than 60° and smaller than 80°, means for causing electric current to flow through said ferromagnetic thin film, high permeability members disposed at opposite sides of said ferromagnetic thin film, and a non-magnetic insulating member disposed between said ferromagnetic thin film and said high permeability members.

BRIEF DESCRIPTION OF THE DRAWINGS

FIG. 1 is a diagram explanatory of a principle of functioning of an MR head,

FIG. 2 is a graph explanatory of a state of magnetic flux distribution within a ferromagnetic thin film, FIG. 7 is a diagram explanatory of the function of the MR head according to the first embodiment of the present invention, FIG. 8 is a diagram showing the relation among the pitch of the grating, thickness of the ferromagnetic thin film and magnitude of the anisotropic magnetic field.

DETAILED DESCRIPTION OF THE PREFERRED EMBODIMENTS

Figure 3:
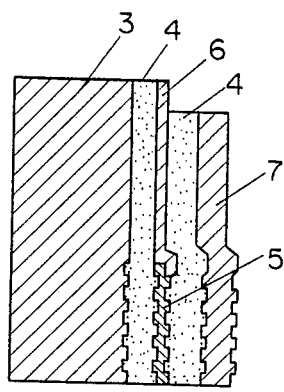
FIG. 3 is a side sectional view of an MR head according to a first preferred embodiment of the present invention.

According to the present invention, in a both side shielded type MR head capable of reproducing short wavelengths, grating formed on at least one surface of a ferromagnetic thin film is utilized as a means for imparing a magnetic anisotropy to the ferromagnetic thin film, and by arranging angles formed between the direction of the grating and an electric current flowing through the ferromagnetic thin film to be larger than 60° and smaller than 80°, it is possible to take out an output with less secondary distortion, without employment of an external bias means.

Since the resistance variation of the ferromagnetic thin film by an external magnetic field has the best linearity when the angle formed between the direction of magnetization and direction of the electric current varies with respect to 45° as a center, in the case where the ferromagnetic thin film has a uniaxial anisotropy, it has been considered preferable to provide the magnetic anisotropy of the ferromagnetic thin film at an angle of 45° with respect to the direction of the electric current. However, as shown in FIG. 1, directions of the magnetization M in the ferromagnetic thin film 1 become more gentle, in the inclination thereof, at opposite end portions of the thin film, i.e., at the opposite edges thereof parallel to the direction of electric current i, than at a central portion of the thin film due to the influence by an demagnetization field. In FIG. 1, numeral 2 designates electrodes. Meanwhile, in the construction in which shield films or the like are disposed at opposite sides of the ferromagnetic thin film 1, as shown in FIG. 2, more external signal magnetic flux $\phi$ passes through the magnetic recording medium side of the ferromagnetic thin film 1, i.e., the head forward end portion side thereof, and as the distance therefrom increases, the magnetic flux flowing through the ferromagnetic thin film 1 is decreased. From the calculation of the transmission path, as shown by a solid line in FIG. 2, on the assumption that the ferromagnetic thin film 1 has a permeability of 500, element width of 15 μm, and thickness of 500 Å, with the distance from the shield $g1=g2=0.5$ μm, it is seen that 70% of the reproduction output is determined in the region at 3 μm from the forward end. Meanwhile, a dotted line in the figure shows $\phi/\phi_o$. From these results as described above, it has been found that the head forward end portion mainly contributes to the head output, and that in order to reduce the secondary distortion in the heat output, the magnetization M at the head forward end portion must be directed in the optimum direction. In other words, in the case where the anisotropy is to be imparted by the grating formed on the surface of the ferromagnetic thin film, upon consideration of the influence by the demagnetization field at the forward end of the ferromagnetic thin film, favorable results have been obtained when the angles formed between the direction of the grating and the direction of the flowing electric current are larger than 60° and smaller than 80°, although partly depending on the configurations of heads.

FIG. 3 shows a side sectional view of an MR head according to one preferred embodiment of the present invention. As shown in this figure, on a substrate 3 made of a high permeability magnetic material such as ferrite or the like, there is formed a ferromagnetic thin film 5 of Ni-Fe, etc. having a thickness of 500 Å, through a non-magnetic insulating film 4 of SiO₂ or the like with a thickness of 0.5 μm. In contact with the end portions of the ferromagnetic thin film 5, electrodes 6 of a non-magnetic electrically conductive material such as Au, Cu, Al or the like are provided. A magnetic shield film 7 of 0.5 μm in thickness made of Ni-Fe, Fe-Al-Si or the like is further formed thereon through another non-magnetic insulating layer 4 of 0.5 μm in thickness. The thin films as described so far are formed by vapor deposition, sputtering or plating or the like, and shaped into a desired configuration by photolithography.

Figure 4:
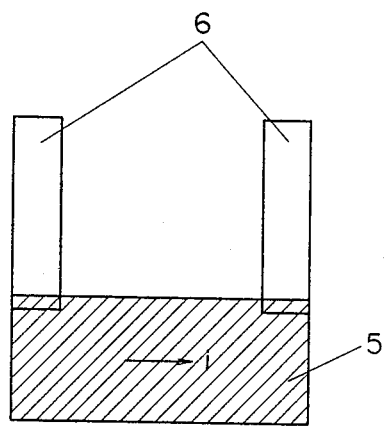
FIG. 4 is a diagram showing a ferromagnetic thin film portion of the MR head according to the first embodiment of the present invention.
Figure 5:
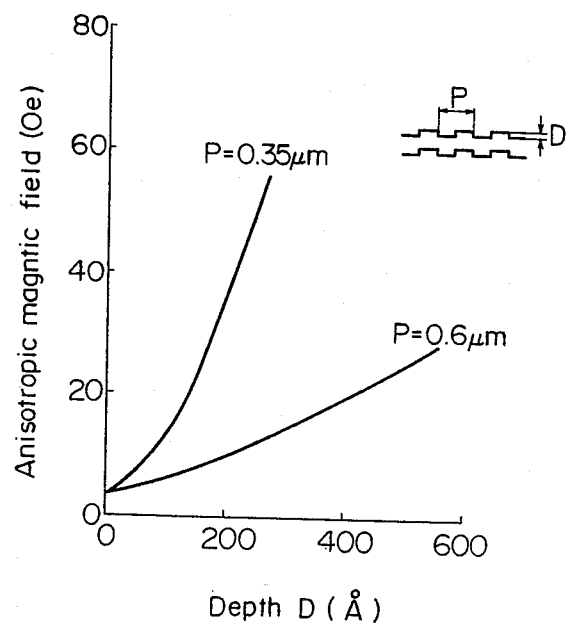
FIG. 5 is a diagram showing the relation between the depth and pitch of grating and the magnitude of an anisotropic magnetic field.
Figure 6:
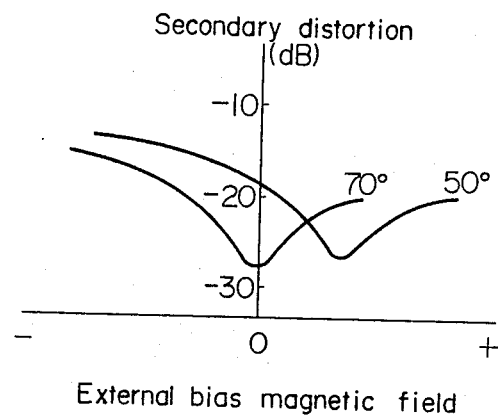
FIG. 6 is a diagram showing a state of a secondary distortion variation by an external bias for the MR head according to the first embodiment of the present invention.

On the surface of the substrate 3, there are formed grating, for example of 0.3 μm in pitch and 200 Å in depth in a direction of 70° with respect to the electric current i as shown in FIG. 4 by subjecting the substrate to ion-milling with a photoresist pattern formed into a grating through utilization of the interference effect of a laser beam. The anisotropic magnetic field imparted to the ferromagnetic thin film 5 differs according to the pitch P for the grating and depth D thereof on the thin films, and by way of example, the case of 83 Ni-Fe film of 500 Å in thickness is represented as in FIG. 5, with Hk=36 Oe in the example of FIG. 4. Upon observation of variations of the secondary distortion for the head prepared as described above, with respect to the magnitude of the external bias magnetic field, the distortion becomes the minimum at a point where the external bias magnetic field is zero in the head according to the present embodiment as shown in FIG. 6. However, in a head in which the angle formed between the direction of the grating and direction of the flowing current is 50°, there is a point where the distortion becomes the minimum upon further application of an external bias, and thus, it is seen that a value larger than 50° is required for the angle to be formed between the direction of the anisotropy imparted by the grating and the direction in which the electric current flows. Although the angle of the direction of the grating which provides the optimum bias point is 70° in this embodiment, it has been found that this is merely one example, and that the angle may differ according to the thickness, width, gap length, etc. of the ferromagnetic thin film. Upon addition of such findings as above, with a further consideration from viewpoints such as fluctuations in manufacturing, etc., the angles were found to be between larger than 60° and smaller than 80° in order to obtain the state close to the optimum bias point more stably.

If the depth of the grating exceeds the thickness of the ferromagnetic thin film (measured perpendicularly to the directions of the current i and grating), there is a possibility that the ferromagnetic thin film is cut off at stepped portions, and therefore, it is desirable to arrange that the depth of the grating to be formed to obtain the required magnitude of the anisotropic magnetic field does not exceed the film thickness, by properly selecting the pitch for the grating.

Upon impression of a strong magnetic field to the head thus prepared from outside, the magnetization in the ferromagnetic thin film is aligned in one direction, and the variation ΔR of the resistance thereof with respect to the external signal magnetic field Hsig in a direction normal to the direction of the electric current becomes as shown in FIGS. 7A and 7B. FIG. 7B relates to a case where the external signal magnetic field is stronger than that in FIG. 7A, and in such a state, the direction of the magnetization in the ferromagnetic thin film becomes random, with a consequent reduction of the output. In the actual applications, if the magnetic anisotropy is imparted by properly selecting the pitch and depth of the grating so that such a state may not be brought about by the signal magnetic field from the magnetic recording medium, the head functions sufficiently stably.

Figure 9:
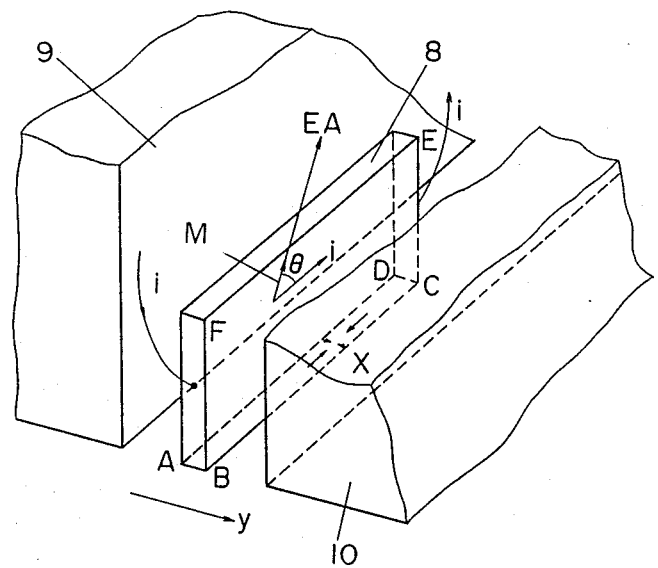
FIG. 9 is a perspective view of an MR head according to a second embodiment of the present invention.

With respect to the shield films, it is desirable that the permeability thereof is as large as possible, but since there is a relation as shown in FIG. 8 between the anisotropic magnetic field and film thickness, although the anisotropy tends to be large due to the influence of the grating at the lower part, and the permeability is inferior at the same film thickness as in the conventional heads, favorable characteristics may be obtained if the shield film thickness is increased up to more than that in the conventional films. FIG. 9 shows another embodiment according to the present invention.

This thin film magnetic head is of a both side shielded type head in which magnetic members 9 and 10 with a high permeability are disposed at opposite sides of the ferromagnetic thin film 8. Normally, the magnetic member 9 is a substrate for forming the thin film element, and employs a high permeability magnetic material such as ferrite or the like. In a manner similar to that in the first embodiment, grating is formed on the surface thereof.

On the other hand, the high permeability magnetic member 10 is made of an alloy thin film of Ni-Fe, Fe-Al-Si, amorphous ferromagnetic material, etc., and has a thickness in the range of 0.1 to 5 μm or thereabout. Now, on the assumption that an average direction of magnetization M of the ferromagnetic thin film 8 is in a state inclined by $\theta$ with respect to the electric current i passing through the ferromagnetic film 8, a self-bias may be achieved if the angle $\theta$ is properly selected thus making it possible to effect the linear functioning, and it becomes important that there is no disturbance in the angle $\theta$ in the vicinity of the forward end.

Accordingly, it is assumed that the influence of processing strain which would remain at the forward end portion during processing of the head might be associated with the head characteristics.

In the case as in FIG. 9, lapping is normally applied to the head forward end portion. Such a processing, although different in the extent, causes a compression stress to remain as shown by an arrow X, within a plane parallel to the face (face ABCD) in the thickness direction of the MR element thin film 8. Therefore, the direction of magnetizaiton is not affected at all, if a magnetostriction constant $\lambda$ of the ferromagnetic thin film 8 is perfectly zero (the state of which is very difficult to be realized), but the angle $\theta$ varies by a counter-magnetostriction phenomenon if the magnetostriction constant $\lambda$ is not completely zero. Generally, since the thickness of the ferromagnetic thin film 8 is in the range of 500 to 1000 Å which are smaller than other dimensions, the demagnetization field in the direction of thickness is large. Therefore, inclination of the magnetization in the thickness direction does not occur. It may be approximated that all the magnetizations are present in a plane parallel to the surface BCEF.

Now, if $\lambda > 0$, the magnetization comes to be directed in a direction normal to the compression stress so as to lower the energy. This is the direction in which the angle $\theta$ is increased (i.e., direction normal to the current i). Meanwhile, if $\lambda < 0$, variation is effected in the direction to reduce the angle $\theta$ (i.e., direction parallel to the current i) since the magnetization is directed in a direction parallel to the direction of the compression stress. In general, in the vicinity of the forward end portion, the direction of the magnetization tends to be inclined due to the demagnetization field, i.e., it tends to reduce the angle $\theta$, and therefore, in order to cancel the influence of the demagnetization field and maintain the optimum angle $\theta$, it is more preferable that the value $\lambda$ is somewhat on the positive side.

On the other hand, it is preferable, on the contrary, that the high permeability magnetic film 10 has the magnetostriction constant $\lambda$ at zero or somewhat at the negative side by the reason as follows. Since it is important that this portion has a high permeability as the magnetic shield member, and for this purpose, the anisotropy should preferably be in a longitudinal direction 11 (i.e., in a direction parallel to the track widthwise direction in the above case) to utilize the hard axis function, i.e., the rotation of magnetization for a higher permeability at the high frequency range. However, since the permeability may also be decreased if an excessive anisotropy is imparted, the magnetostriction constant should preferably be not too large, even if it is on the negative side.

As described above, although merely arranging the material composition of the ferromagnetic thin film 8 so that the magnetostriction constant thereof becomes positive or zero, may apparently seem to have a predetermined effect qualitatively, it has been found, through experiments, that conspicuous effects are achieved only when there is involved the fact that the magnetostriction constant $\lambda$ of the high permeability magnetic member (alloy thin film) 10 which serves as a shield is zero or negative. For the above, reasons as follows may be considered. If the magnetostriction constant of the composition for the high permeability magnetic member (alloy thin film) 10 is positive, the effective permeability at the forward end portion is small, and therefore, it is not possible to reduce the magnitude of the demagnetization field due to magnetic charge produced at the forward end portion of the ferromagnetic thin film 8. Accordingly, at the forward end portion of the ferromagnetic thin film 8, the magnetization functions in a direction to be deviated from the optimum angle. On the contrary, even when the magnetostriction constant of the high permeability magnetic member (alloy thin film) 10 is zero or negative, with a high permeability maintained at the forward end portion thereof, if the composition selection is such that the magnetization is deviated from the optimum angle at the forward end of the ferromagnetic thin film 8, i.e., in the case where the magnetostriction constant is negative, the desired effect cannot be obtained after all from the viewpoint of short wavelength reproduction.

It is to be noted here that a symbol y indicates the running direction of the magnetic recording medium.

The selection of the same material Ni-Fe alloy for the ferromagnetic thin film 8 and the alloy thin film 10 has an advantage as follows. The first point is that said material is a high permeability material having a comparatively large magnetoresistance. The second point is that Ni and Fe have vapor pressures extremely close to each other, and the compositions thereof may be comparatively readily controlled by a vacuum deposition process employing a single evaporating source. Moreover, with respect to the above second point, a third advantage may be characterized through a detailed investigation made thereinto. More specifically, although vapor pressure curves for Ni and Fe closely resemble each other, Fe has a slightly larger vapor pressure. Accordingly, during the vapor deposition, when several evaporations take place with respect to a mother alloy having a certain initial composition and serving as an evaporation source, the composition of the mother alloy comes to be deviated. Consequently, thin films with a deviated composition are obtained from the mother alloy having its composition deviated as described above, and if the same material is employed therefor as in the present invention, it is possible to properly utilize the mother alloy having its magnetostriction constant altered to the positive or negative side for effective utilization of the evaporation source mother alloy.

According to the present embodiment, during processing of heads, the influence of the processing strain which can never be reduced completely to zero even through employment of any processing method, may be caused to act rather in a favorable direction with respect to the head characteristics. Consequently, the orientation of magnetization at the ferromagnetic thin film forward end portion can be optimized, and in cooperation with the higher permeability of the shield layer, reproduction signals having a favorable linearity with less distortion may be obtained, and moreover, it becomes possible to effect an efficient short wavelength reproduction.

Figure 10:
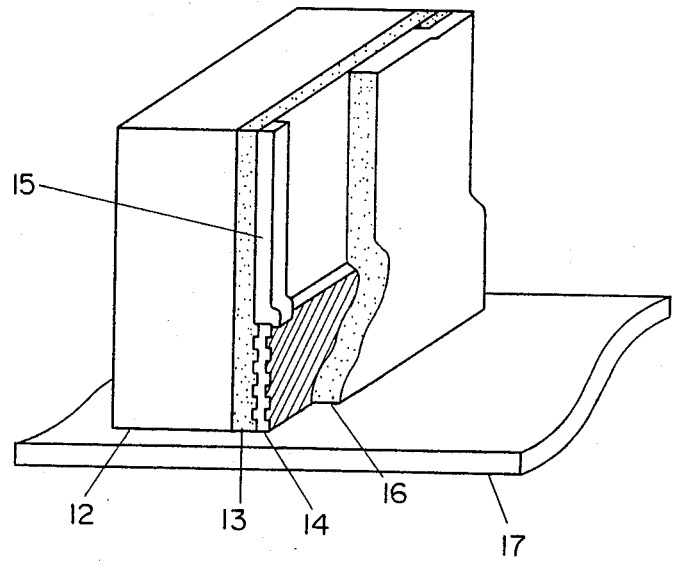
FIG. 10 is a perspective view of an MR head according to a third embodiment of the present invention.

FIG. 10 shows a perspective view of a thin film magnetic head of still another embodiment of the present invention. On a high permeability magnetic material substrate 12 of ferrite or the like, a Zn ferrite layer 13 of a non-magnetic insulating material is sputtered, on which there are further formed a ferromagnetic thin film 14 of Ni-Fe, etc. and electrodes 15 made of a non-magnetic electrically conductive material such as Au, Cu or the like, with a non-magnetic insulating material layer 16 being further formed thereon. The refractive index of the Zn ferrite layer 13 is larger than the refractive index of a positive type photoresist (which is about 1.6, for example, in AZ-1350J), and it is possible to form a resist pattern having grating with a pitch of, for example, 0.4 μm through favorable adhesion and reproduction of configurations by light interference and the like. This is attributable to the fact that during exposure of interference of a laser beam, etc., the position of a node of a standing wave resulting from an interference between a reflected light and an incident light at a boundary face of the ferrite or ceramics for the non-magnetic insulating material and the photoresist, is brought exactly to the boundary face of the ferrite or ceramics and the photoresist in the case where the photoresist has a smaller refractive index, and thus, the adhesion of photoresist after the developing is favorable, with an improvement of reproducibility of the resist pattern configuration. With this resist pattern employed as a mask, grating having a pitch of 0.4 μm and a depth of 400 Å are formed on the surface of the Zn ferrite layer 13 by the ion-milling process. Due to the grating as described above, on the ferromagnetic thin film 14 formed thereover, anisotropy based on the configuration magnetic anisotropy is produced in the direction along the grating. The anisotropic magnetic field Hk of the above anisotropy was 20 Oe.

It is to be noted that a numeral 17 indicates a magnetic recording medium.

For a comparative example, SiO$_2$ was deposited on surfaces of the Zn ferrite layers referred to earlier by sputtering, to 0.3 μm and 0.5 μm, with ferromagnetic thin films being further formed thereon, and the anisotropic magnetic fields Hk of these ferromagnetic thin films were 15 Oe and 11 Oe respectively. Meanwhile, when SiO$_2$ layers were formed by altering the sputtering rate, anisotropic magnetic fields Hk thereof show scattering with 12 to 18 Oe at 0.3 μm thick, and 8 to 15 Oe at 0.5 μm thick. As described above, upon formation of the SiO$_2$ layer on the surface formed with the grating, it becomes difficult to control, at a favorable reproducibility, the magnitude of the anisotropic magnetic field Hk according to the thickness and sputtering conditions for SiO$_2$. The inconvenience as described above is considered to be attributable to the fact that, since the production of the anisotropy is based on the configuration magnetic anisotropy, the configuration of the grating is varied by the SiO$_2$ layer. Moreover, since the various kinds of ferrite and ceramics such as TiO$_2$ employed as insulating materials are very hard with a sufficient resistance against abrasion, they show favorable characteristics also as gap forming materials for heads.

In Zn ferrite, the magnetic characteristics and electrical conductivity may be varied normally through alteration of the ratio of ZnO and Fe$_2$O$_3$, and Zn ferrite can be made non-magnetic and insulating by proper composition ratio and manufacturing conditions. It is to be noted here that the specific resistance of normally available ferrite is in the range of several Ω·cm to several 10$^4$ Ω·cm, and the range as referred to above may be regarded as insulating nature according to the present invention.

Figure 11:
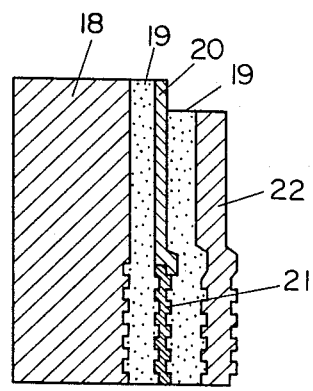
FIG. 11 is a side sectional view of an MR head according to a fourth embodiment of the present invention.
Figure 12:
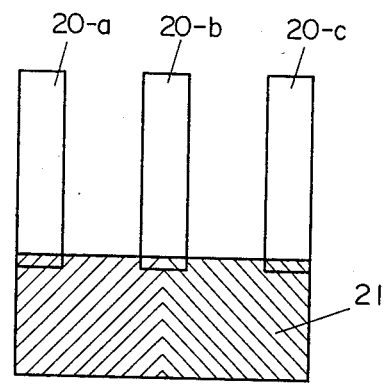
FIG. 12 is a diagram showing configurations of the grating formed on the ferromagnetic thin film of the MR head according to the fourth embodiment of the present invention.
Figure 13:
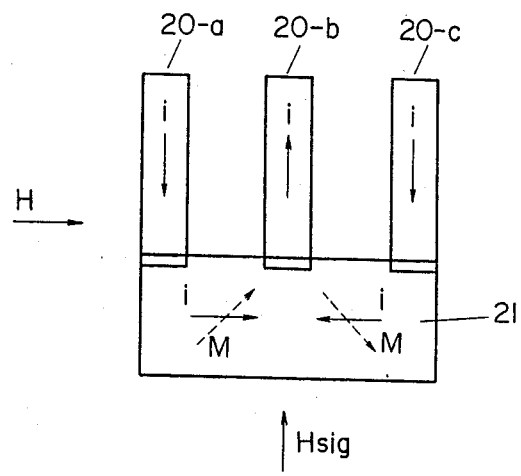
FIG. 13 is a diagram explanatory of functioning of the MR head according to the fourth embodiment of the present invention.

Subsequently, an example in which the present invention is applied to a head of a push-pull construction will be explained. FIG. 11 shows a construction in section of the above head. In this magnetic head, a ferromagnetic thin film 21 of Ni-Fe and the like is formed on a substrate 18 made of a high permeability magnetic material such as ferrite, etc., through a non-magnetic insulating member 19 of SiO$_2$ or the like, while electrodes 20 of a non-magnetic electrically conductive material such as Au, Cu or the like are connected to the ferromagnetic thin film 21. Further formed thereon through a non-magnetic insulating material 19 made of the same material as the insulating material 19 described earlier, is a magnetic shield layer 22 made of Ni-Fe, Fe-Al-Si or the like. As shown in FIG. 12, on the surface of the substrate 18, grating, for example, 0.3 μm in pitch and 200 Å in depth are symmetrically formed with respect to a position of a central electrode 20-b of electrodes 20-a, 20-b, and 20-c connected to the ferromagnetic thin film 21. These portions are formed by subjecting the resist pattern formed in the shape of stripes to the mask ion-milling. Owing to this grating, the ferromagnetic thin film 21 formed thereon has a strong anisotropy in the direction of said grating, with the magnetization in the film being directed in the direction generally along the grating. In the above state, when a strong magnetic field H is applied from the outside in a direction generally parallel to the direction of the electric current i in the ferromagnetic thin film 21 as shown in FIG. 13, the magnetization M is directed in the direction shown in the figure, and upon impression of an external signal magnetic field Hsig in a direction normal to the electric current i, i.e., normal to the magnetic field H, reproduction signals are obtained between the electrodes 20-a and 20-b, and between the electrodes 20-b and 20-c. When the voltage between the electrodes 20-a and 20-b is increased, a decreasing voltage appears between the electrodes 20-b and 20-c on the contrary, and therefore, if both of the reproduction signals are taken out through differentiation, second harmonic distortions contained therein are cancelled to each other for a reduction to a large extent.

Possibility of industrial utilization

In the MR head according to the present invention, different from the conventional cases in which the biaisng is effected by an electric current flowing through the electrically conductive film, it is possible to arrange that the secondary distortion levels of the respective elements for the regions different in the directions of the grating become the minimum by properly determining the directions of the grating on the surface of the ferromagnetic thin film. Accordingly, the secondary distortion level in the case where the output is derived through differentiation is further reduced, with a simultaneous reduction of the increase of the secondary distortion produced by the azimuth deviation.

What is claimed is:

1. A thin film magnetic head which comprises a film of ferromagnetic magnetoresistive material, means for directing electric current through said ferromagnetic thin film in a first direction, high permeability members provided at opposite sides of said ferromagnetic thin film, and non-magnetic insulating members disposed between said ferromagnetic thin film and said high permeability members, said ferromagnetic thin film having a grating formed in said material on at least one surface thereof on at least one of said opposite sides, said grating being formed of grooves in said at least one surface in a second direction at an angle larger than 60° and smaller than 80° with respect to said first direction.

2. A thin film magnetic head as claimed in claim 1, wherein said ferromagnetic thin film has a thickness perpendicular said first and second directions and said grating has a depth smaller than said thickness of said ferromagnetic thin film.

3. A thin film magnetic head as claimed in claim 1, wherein said ferromagnetic thin film has a nonnegative magnetostriction constant, at least one of said high permeability members having a nonpositive magnetostriction constant.

4. A thin film magnetic head as claimed in claim 1, wherein the grating has a plurality of regions having grooves extending in respective grating directions which are different from each other, said grating directions of said grooves in respective regions being symmetrical with respect to the direction of a boundary between said regions, each of said grating directions being at an angle less than 80° and greater than 60° with respect to said first direction.

* * * * *